US012771833B2

(12) United States Patent
Kahu et al.

(10) Patent No.: US 12,771,833 B2
(45) Date of Patent: Oct. 20, 2026

(54) SYSTEMS AND METHODS FOR CROSS-COMPONENT SAMPLE OFFSET FILTER INFORMATION SIGNALING

(71) Applicant: Tencent America LLC, Palo Alto, CA (US)

(72) Inventors: Samruddhi Yashwant Kahu, Palo Alto, CA (US); Xin Zhao, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/195,870

(22) Filed: May 10, 2023

(65) Prior Publication Data

US 2024/0129461 A1 Apr. 18, 2024

Related U.S. Application Data

(60) Provisional application No. 63/413,237, filed on Oct. 4, 2022.

(51) Int. Cl.
*H04N 19/117* (2014.01)
*H04N 19/176* (2014.01)
(Continued)

(52) U.S. Cl.
CPC ......... *H04N 19/117* (2014.11); *H04N 19/176* (2014.11); *H04N 19/186* (2014.11);
(Continued)

(58) Field of Classification Search
None
See application file for complete search history.

(56) References Cited

U.S. PATENT DOCUMENTS 5,990,957 A * 11/1999 Ryoo ..................... H04N 19/61 375/E7.157
2013/0322526 A1* 12/2013 Aoki .................... H04N 19/124 375/240.03

(Continued)

FOREIGN PATENT DOCUMENTS

CN 116888963 A * 10/2023 ........... H04N 19/117

OTHER PUBLICATIONS

Tencent Technology, ISRWO, PCT/US2023/021918, Aug. 4, 2023, 14 pgs.

(Continued)

*Primary Examiner* — Mohammed Jebari
(74) *Attorney, Agent, or Firm* — Morgan, Lewis & Bockius LLP

(57) ABSTRACT

The various embodiments described herein include methods and systems for encoding and decoding video. In one aspect, a method includes obtaining video data comprising a plurality of blocks, including a first block, from a video bitstream. The method further includes predicting a set of parameters for filtering the first block, where the set of parameters are not explicitly signaled in the video bitstream. The method also includes obtaining a filtered first block by applying a cross-component sample offset (CCSO) to the
(Continued)

first block, where the CCSO is based on the set of parameters. The method also includes reconstructing a picture from the video data using the filtered first block.

20 Claims, 10 Drawing Sheets

(51) Int. Cl.
*H04N 19/186* (2014.01)
*H04N 19/70* (2014.01)
*H04N 19/82* (2014.01)
*H04N 19/85* (2014.01)

(52) U.S. Cl.
CPC ............. *H04N 19/70* (2014.11); *H04N 19/82* (2014.11); *H04N 19/85* (2014.11)

(56) References Cited

U.S. PATENT DOCUMENTS

| | | | | |
|---|---|---|---|---|
| 2014/0003497 | A1 | 1/2014 | Sullivan et al. | |
| 2016/0241853 | A1 | 8/2016 | Lim et al. | |
| 2017/0085910 | A1* | 3/2017 | Oh | H04N 19/126 |
| 2018/0352225 | A1* | 12/2018 | Guo | H04N 19/186 |
| 2019/0158831 | A1* | 5/2019 | Jung | H04N 19/157 |
| 2020/0029080 | A1* | 1/2020 | Kim | H04N 19/136 |
| 2021/0084318 | A1* | 3/2021 | Kuo | H04N 19/117 |
| 2021/0092380 | A1 | 3/2021 | Wang et al. | |
| 2021/0306673 | A1* | 9/2021 | Sarwer | H04N 19/182 |
| 2022/0038721 | A1* | 2/2022 | Li | H04N 19/186 |
| 2022/0070462 | A1* | 3/2022 | Ikonin | H04N 19/44 |
| 2022/0109832 | A1 | 4/2022 | Du et al. | |
| 2022/0150490 | A1 | 5/2022 | Kuo et al. | |
| 2022/0150517 | A1* | 5/2022 | Du | H04N 19/70 |
| 2022/0182680 | A1 | 6/2022 | Du et al. | |
| 2022/0248007 | A1* | 8/2022 | Misra | H04N 19/117 |
| 2022/0295054 | A1* | 9/2022 | Zhao | H04N 19/117 |
| 2022/0303586 | A1 | 9/2022 | Du et al. | |
| 2023/0143147 | A1* | 5/2023 | Du | H04N 19/70 375/240.26 |
| 2024/0267548 | A1* | 8/2024 | Du | H04N 19/44 |
| 2025/0106394 | A1* | 3/2025 | Yin | H04N 19/463 |
| 2025/0203071 | A1* | 6/2025 | Wang | H04N 19/186 |

OTHER PUBLICATIONS

Benjamin Bross et al., “Versatile Video Coding (Draft 8)”, Joint Video Experts Team (JVET) of ITU-T SG 16 WP 3 and ISO/IEC JTC 1/SC 29/WG 11, 17th Meeting: Brussels, BE, Jan. 7-17, 2020, Document: JVET-Q2001-vE, 510 pgs.

Chia-Yang Tsai et al., “TE10 Subtest2: Coding Unit Synchronous Picture Quadtree-based Adaptive Loop Filter”, Joint Collaborative Team on Video Coding (JCT-VC) of ITU-T SG16 WP3 and ISO/IEC JTC1/SC29/WG11, 3rd Meeting: Guangzhou, CN Oct. 7-15, 2010, Document: JCTVC-C143, 12 pgs.

Debargha Mukherjee et al., “A Switchable Loop-Restoration with Side-Information Framework for the Emerging AV1 Video Codec”, 2017 IEEE, 5 pgs.

Peter de Rivaz et al., “AV1 Bitstream & Decoding Process Specification”, The Alliance for Open Media, Jan. 8, 2019, 681 pgs.

Jonathan Taquet et al., “CE5: Results of tests CE5-3.1 to CE5-3.4 on Non-Linear Adaptive Loop Filter”, Joint Video Experts Team (JVET) of ITU-T SG 16 WP 3 and ISO/IEC JTC 1/SC 29/WG 1114th Meeting: Geneva, CH, Mar. 19-27, 2019, Document: JVET-N0242, 10 pgs.

Kiran Misra et al., “CE5-related: On the design of CC-ALF”, Video Experts Team (JVET) of ITU-T SG 16 WP 3 and ISO/IEC JTC 1/SC 29/WG 1116th Meeting: Geneva, CH, Oct. 1-11, 2019, Document: JVET-P1008-v2, 6 pgs.

Kiran Misra et al., “Cross-Component Adaptive Loop Filter for Chroma”, Joint Video Experts Team (JVET) of ITU-T SG 16 WP 3 and ISO/IEC JTC 1/SC 29/WG 1115th Meeting: Gothenburg, SE, Jul. 3-12, 2019, Document: JVET-O0636_r1, 9 pgs.

Steinar Midtskogen et al., “Integrating Thor Tools into the Emerging AV1 Codec”, Cisco Systems, Inc., 2017 IEEE, 4 pgs.

Steinar Midtskogen et al., “The AV1 Constrained Directional Enhancement Filter (CDEF)”, 5 pgs.

Thomas J. Daede et al., “Daala: A Perceptually-Driven Next Generation Video Codec”, 2015-2016 Mozilla Foundation, 10 pgs.

Yue Chen et al., “An Overview of Core Coding Tools in the AV1 Video Codec”, 2018 IEEE, 5 pgs.

Tencent America LLC, Extended European Search Report, EP Patent Application No. 23869281.8, May 28, 2026, 16 pgs.

Che-Wei Kuo et al., “Cross-Component Sample Adaptive Offset”, 2022 Data Compression Conference (DCC), Mar. 2022, 10 pgs.

* cited by examiner (1) Subsampled positions for vertical gradient (2) Subsampled positions for horizontal gradient (3) Subsampled positions for diagonal gradient (4) Subsampled positions for diagonal gradient

SYSTEMS AND METHODS FOR CROSS-COMPONENT SAMPLE OFFSET FILTER INFORMATION SIGNALING

CROSS-REFERENCE TO RELATED APPLICATION

This application claims priority to U.S. Provisional Patent Application No. 63/413,237, entitled "IMPROVED CROSS-COMPONENT SAMPLE OFFSET FILTER INFORMATION SIGNALING" filed Oct. 4, 2022, which is hereby incorporated by reference in its entirety.

TECHNICAL FIELD

The disclosed embodiments relate generally to video coding, including but not limited to systems and methods for signaling and predicting cross-component sample offset filter information.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored.

Multiple video codec standards have been developed. For example, video coding standards include AOMedia Video 1 (AV1), Versatile Video Coding (VVC), Joint Exploration test Model (JEM), High-Efficiency Video Coding (HEVC/H.265), Advanced Video Coding (AVC/H.264), and Moving Picture Expert Group (MPEG) coding. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

HEVC, also known as H.265, is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC), also known as H.266, is a video compression standard intended as a successor to HEVC. ITU-T and ISO/IEC published the VVC/H.266 standard in 2020 (version 1) and 2022 (version 2). AV1 is an open video coding format designed as an alternative to HEVC. On Jan. 8, 2019, a validated version 1.0.0 with Errata 1 of the specification was released.

SUMMARY

As mentioned above, encoding (compression) reduces the bandwidth and/or storage space requirements. As described in detail later, both lossless compression and lossy compression can be employed. Lossless compression refers to techniques where an exact copy of the original signal can be reconstructed from the compressed original signal via a decoding process. Lossy compression refers to coding/decoding process where original video information is not fully retained during coding and not fully recoverable during decoding. When using lossy compression, the reconstructed signal may not be identical to the original signal, but the distortion between original and reconstructed signals is made small enough to render the reconstructed signal useful for the intended application. The amount of tolerable distortion depends on the application. For example, users of certain consumer video streaming applications may tolerate higher distortion than users of cinematic or television broadcasting applications. The compression ratio achievable by a particular coding algorithm can be selected or adjusted to reflect various distortion tolerance: higher tolerable distortion generally allows for coding algorithms that yield higher losses and higher compression ratios.

A video encoder and/or decoder can utilize techniques from several broad categories and steps, including, for example, motion compensation, Fourier transform, quantization, and entropy coding. A loop filtering approach named cross-component sample offset (CCSO) may be used to reduce distortion of reconstructed samples. In CCSO, given processed input reconstructed samples of a first color component, a non-linear mapping is used to derive output offset, and the output offset is added on the reconstruction sample of another color component in the CCSO filtering process. However, CCSO requires multiple syntaxes, such as the quantization step size, filter shape index, band information, and the like. This information is costly to signal, particularly for small resolutions, and therefore limits the coding performance of CCSO.

In accordance with some embodiments, a method of video decoding is provided. The method includes: (i) receiving video data comprising a plurality of blocks, including a first block, from a video bitstream; (ii) obtaining a syntax element value from the video bitstream, where the syntax element value indicates a difference in a parameter associated with the first block and a reference parameter associated with a second block, and where the parameter is one of a set of parameters; (iii) deriving a value of the parameter associated with the first block based on the syntax element value, where the parameter associated with the first block is not explicitly signaled in the video bitstream; (iv) obtaining a filtered first block by applying a cross-component sample offset (CCSO) to the first block, where the CCSO is based on the set of parameters; and (v) reconstructing a picture from the video data using the filtered first block.

In accordance with some embodiments, a method of video encoding is provided. The method includes: (i) obtaining video data comprising a plurality of blocks, including a first block and a second block; (ii) identifying a set of parameters for use with applying a cross-component sample offset (CCSO) to the first block, wherein a parameter in the set of parameters is identified using a first reference parameter, the reference parameter corresponding to the second block; and (iii) signaling the identified set of parameters in a video bitstream.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and/or a decoder component.

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

In accordance with common practice, the various features illustrated in the drawings are not necessarily drawn to scale, and like reference numerals can be used to denote like features throughout the specification and figures.

DETAILED DESCRIPTION

The present disclosure describes, among other things, predicting, identifying, and signaling filtering parameters for block filtering. For example, filter parameters for cross-component sample offset (CCSO) filtering may be predicted based on previous predicted and/or selected parameter values. Predicting filter parameters, as opposed to explicitly signaling them, reduces signaling cost, which can improve coding efficiency and/or reduce bandwidth.

Example Systems and Devices

Figure 1:
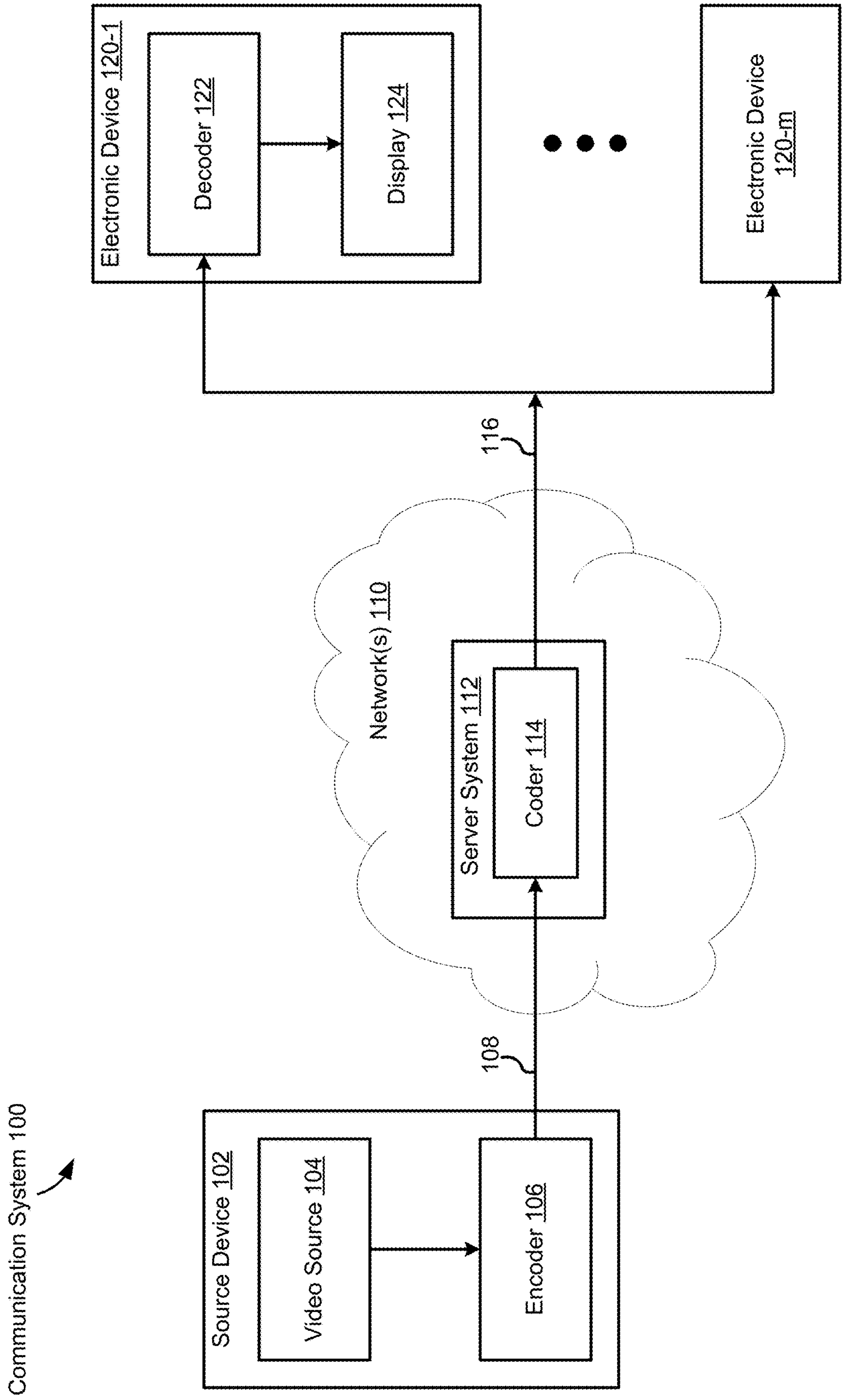
FIG. 1 is a block diagram illustrating an example communication system in accordance with some embodiments.

FIG. 1 is a block diagram illustrating a communication system 100 in accordance with some embodiments. The communication system 100 includes a source device 102 and a plurality of electronic devices 120 (e.g., electronic device 120-1 to electronic device 120-*m*) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video data to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108.

In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 to recover and optionally display the video pictures.

In some embodiments, the transmissions discussed above are unidirectional data transmissions. Unidirectional data transmissions are sometimes utilized in in media serving applications and the like. In some embodiments, the transmissions discussed above are bidirectional data transmissions. Bidirectional data transmissions are sometimes utilized in videoconferencing applications and the like. In some embodiments, the encoded video bitstream 108 and/or the encoded video data 116 are encoded and/or decoded in accordance with any of the video coding/compressions standards described herein, such as HEVC, VVC, and/or AV1.

Figure 2A:
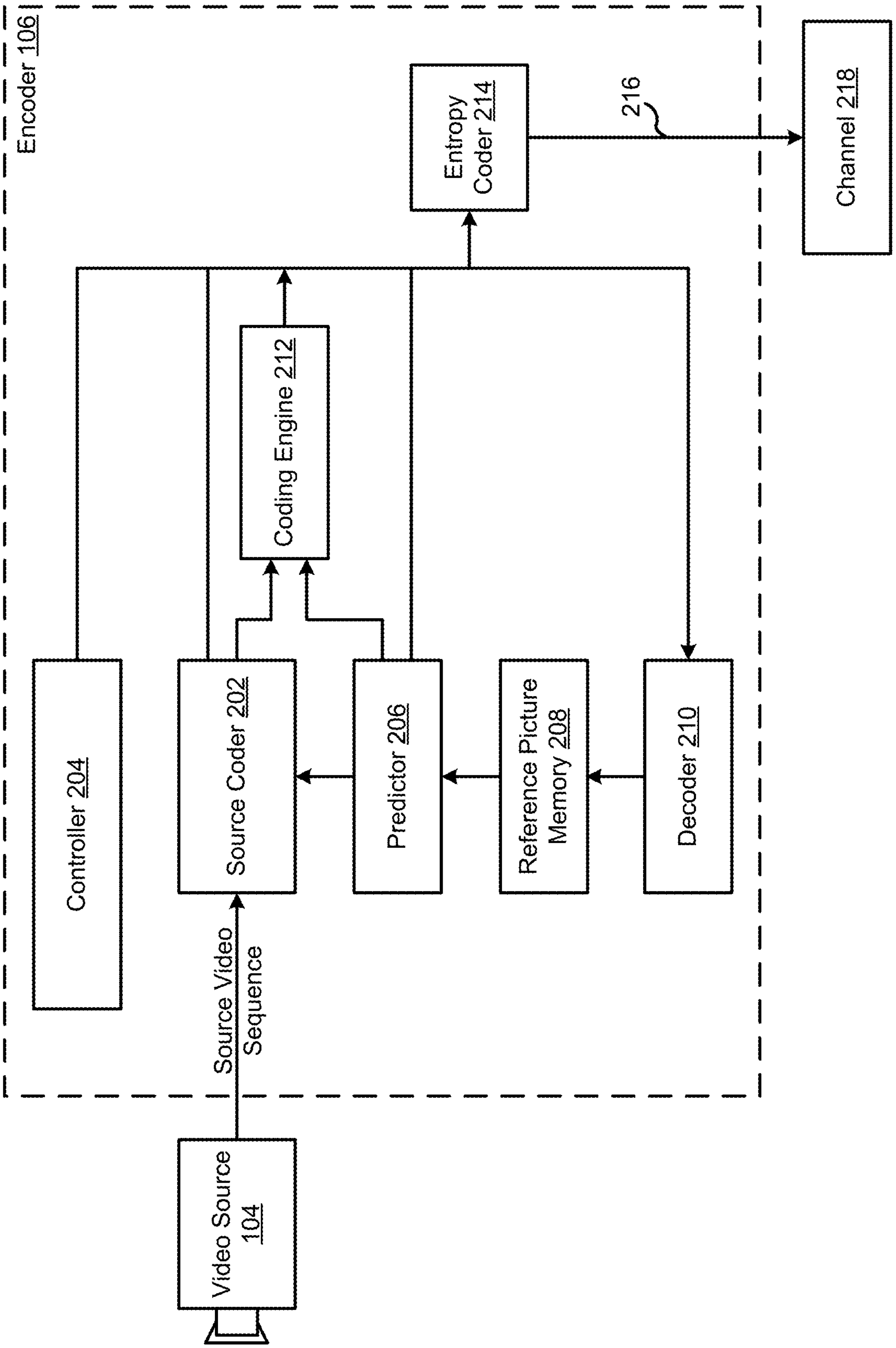
FIG. 2A is a block diagram illustrating example elements of an encoder component in accordance with some embodiments.

FIG. 2A is a block diagram illustrating example elements of the encoder component 106 in accordance with some embodiments. The encoder component 106 receives a source video sequence from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCb, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples. The description below focuses on samples.

The encoder component 106 is configured to code and/or compress the pictures of the source video sequence into a coded video sequence 216 in real-time or under other time constraints as required by the application. Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. In some cases, as determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
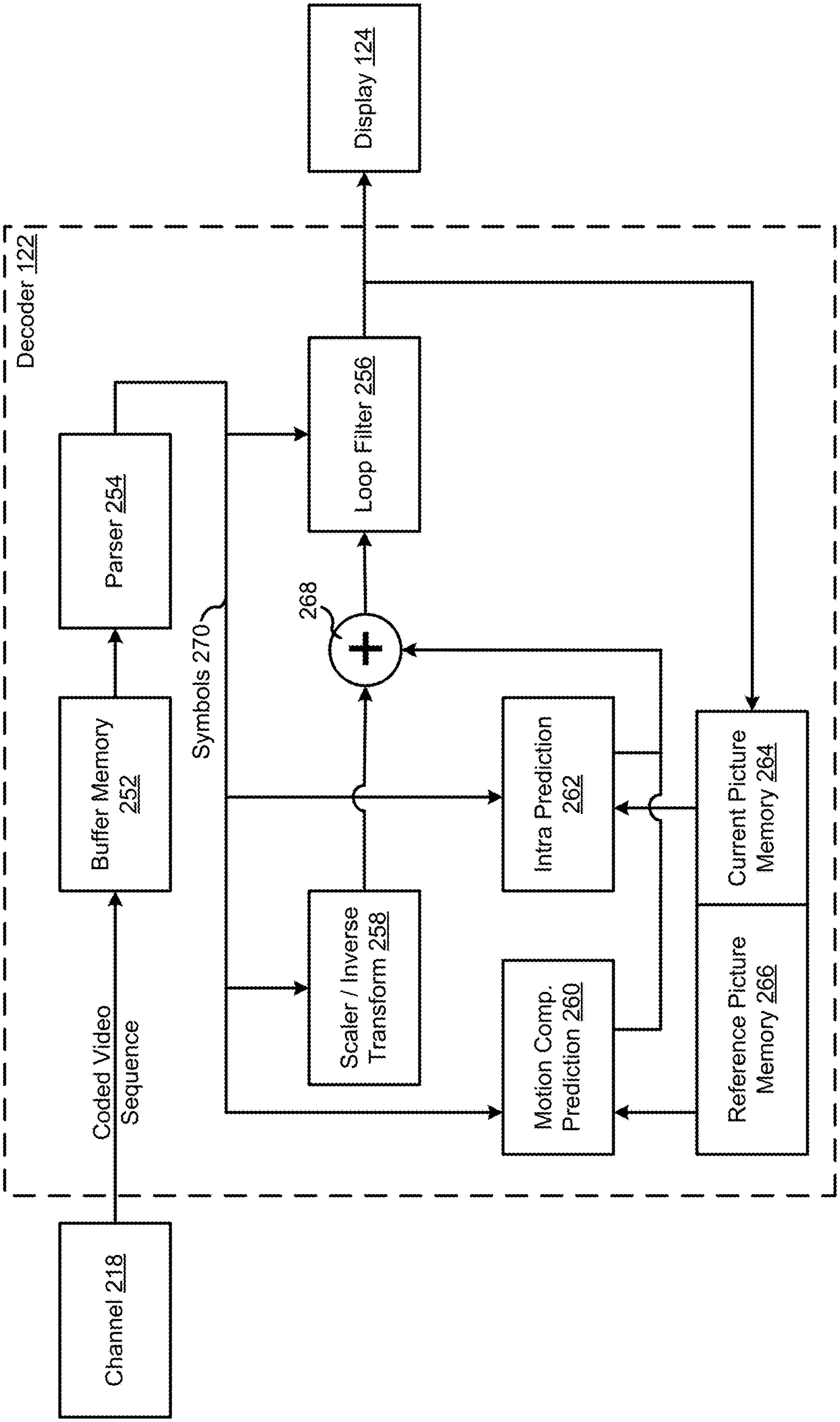
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter unit 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. In some embodiments, the decoder component 122 is implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and can be advantageously of adaptive size, and may at least partially be implemented in an operating system or similar elements (not depicted) outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

Beyond the functional blocks already mentioned, decoder component 122 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is maintained.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values. The output of the loop filter unit 256 can be a sample stream that can be output to a render device such as the display 124, as well as stored in the reference picture memory 266 for use in future inter-picture prediction.

Certain coded pictures, once fully reconstructed, can be used as reference pictures for future prediction. Once a coded picture is fully reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (JIRD) specifications and metadata for HRD buffer management signaled in the coded video sequence.

Figure 3:
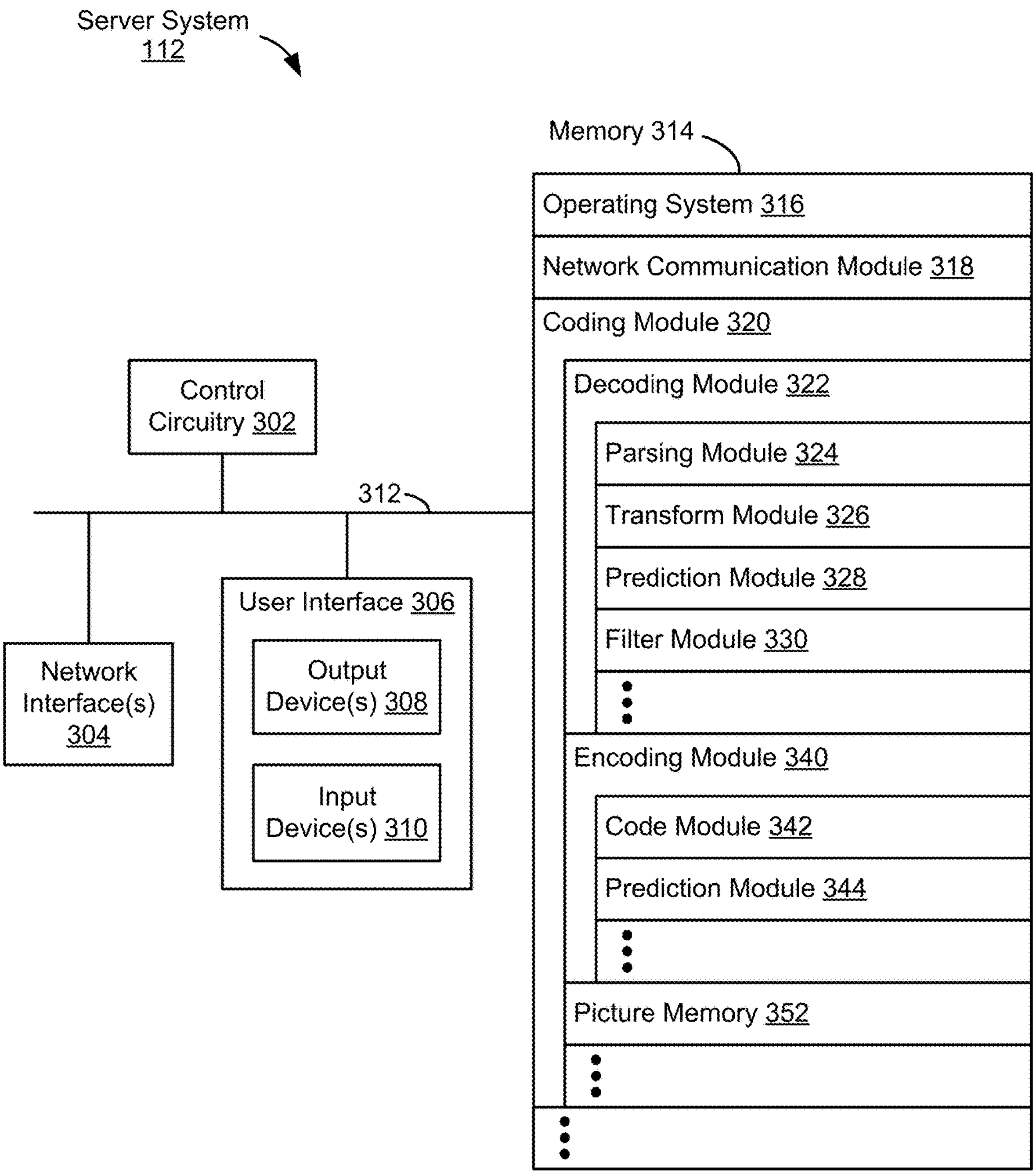
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter unit 256).

In some embodiments, the encoding module 340 includes a code module 342 (e.g., configured to perform the various functions described previously with respect to the source coder 202, the coding engine 212, and/or the entropy coder 214) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

In some embodiments, the server system 112 includes web or Hypertext Transfer Protocol (HTTP) servers, File Transfer Protocol (FTP) servers, as well as web pages and applications implemented using Common Gateway Interface (CGI) script, PHP Hypertext Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Coding Approaches

Figure 4A:
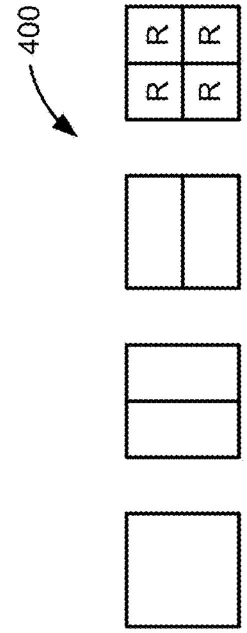
FIGS. 4A-4D illustrate example coding tree structures in accordance with some embodiments.

FIGS. 4A-4D illustrate example coding tree structures in accordance with some embodiments. As shown in a first coding tree structure (400) in FIG. 4A, some coding approaches (e.g., VP9) use a 4-way partition tree starting from a 64×64 level down to a 4×4 level, with some additional restrictions for blocks 8×8. In FIG. 4A, partitions designated as R can be referred to as recursive in that the same partition tree is repeated at a lower scale until the lowest 4×4 level is reached.

Figure 4B:
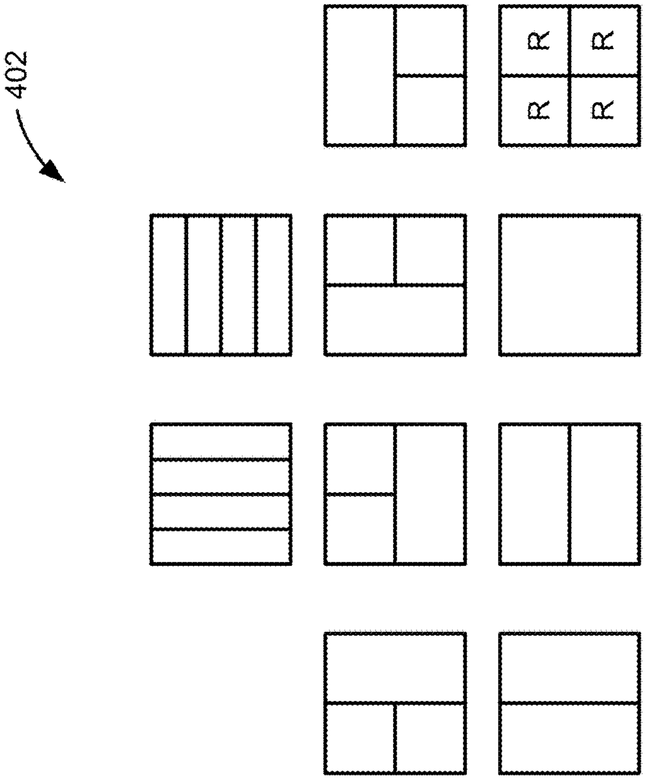
Figure 4C:
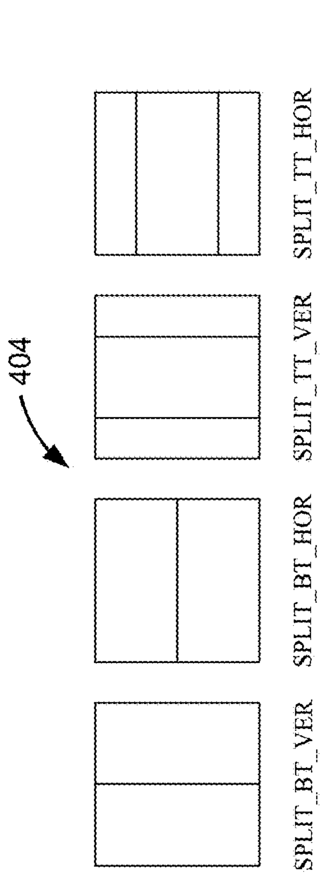

As shown in a second coding tree structure (402) in FIG. 4B, some coding approaches (e.g., AV1) expand the partition tree to a 10-way structure and increase the largest size (e.g., referred to as a superblock in VP9/AV1 parlance) to start from 128×128. The second coding tree structure includes 4:1/1:4 rectangular partitions that are not in the first coding tree structure. The partition types with 3 sub-partitions in the second row of FIG. 4B is referred to as a T-type partition. The rectangular partitions in this tree structure cannot be further subdivided. In addition to a coding block size, coding tree depth can be defined to indicate the splitting depth from the root note. For example, the coding tree depth for the root node, e.g., 128×128, is set to 0, and after a tree block is further split once, the coding tree depth is increased by 1. As an example, instead of enforcing fixed transform unit sizes as in VP9, AV1 allows luma coding blocks to be partitioned into transform units of multiple sizes that can be represented by a recursive partition going down by up to 2 levels. To incorporate AV1's extended coding block partitions, square, 2:1/1:2, and 4:1/1:4 transform sizes from 4×4 to 64×64 are supported. For chroma blocks, only the largest possible transform units are allowed.

As an example, a CTU may be split into CUs by using a quad-tree structure denoted as a coding tree to adapt to various local characteristics, such as in HEVC. In some embodiments, the decision on whether to code a picture area using inter-picture (temporal) or intra-picture (spatial) prediction is made at the CU level. Each CU can be further split into one, two, or four PUs according to the PU splitting type. Inside one PU, the same prediction process is applied, and the relevant information is transmitted to the decoder on a PU basis. After obtaining the residual block by applying the prediction process based on the PU splitting type, a CU can be partitioned into TUs according to another quad-tree structure like the coding tree for the CU. One of the key features of the HEVC structure is that it has multiple partition concepts including CU, PU, and TU. In HEVC, a CU or a TU can only be a square shape, while a PU may be a square or rectangular shape for an inter predicted block. In HEVC, one coding block may be further split into four square sub-blocks, and a transform is performed on each sub-block (TU). Each TU can be further split recursively (using quad-tree split) into smaller TUs, which is called Residual Quad-Tree (RQT). At a picture boundary, such as in HEVC, implicit quad-tree split may be employed so that a block will keep quad-tree splitting until the size fits the picture boundary.

Figure 4D:
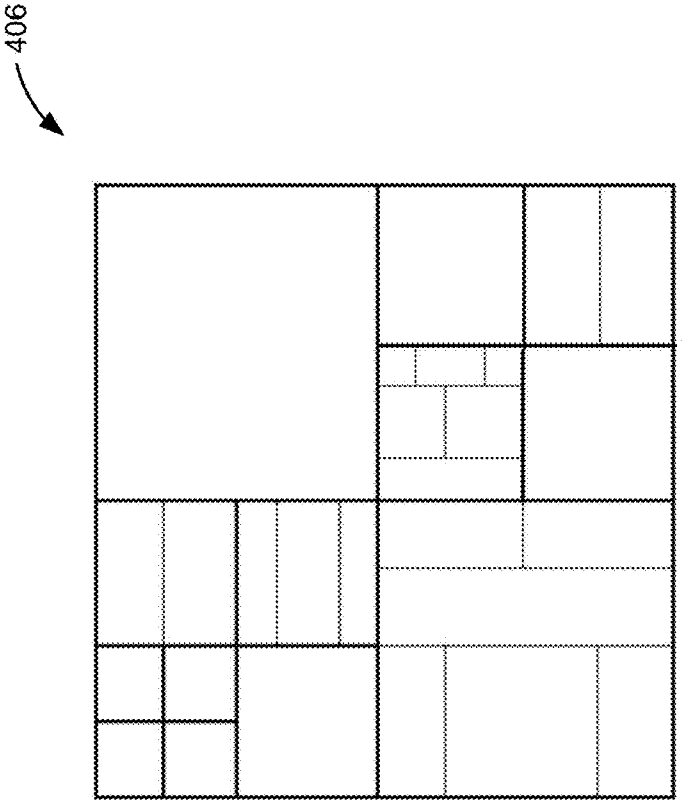

A quad-tree with nested multi-type tree using binary and ternary splits segmentation structure, such as in VVC, may replace the concepts of multiple partition unit types, e.g., it removes the separation of the CU, PU, and TU concepts except as needed for CUs that have a size too large for the maximum transform length, and supports more flexibility for CU partition shapes. In the coding tree structure, a CU can have either a square or rectangular shape. ACTU is first partitioned by a quaternary tree (also referred to as quad-tree) structure. The quaternary tree leaf nodes can be further partitioned by a multi-type tree structure. As shown in a third coding tree structure (404) in FIG. 4C, the multi-type tree structure includes four splitting types. For example, the multi-type tree structure includes vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). The multi-type tree leaf nodes are called CUs, and unless the CU is too large for the maximum transform length, this segmentation is used for prediction and transform processing without any further partitioning. This means that, in most cases, the CU, PU, and TU have the same block size in the quad-tree with nested multi-type tree coding block structure. An exception occurs when a maximum supported transform length is smaller than the width or height of the color component of the CU. An example of block partitions for one CTU (406) is shown in FIG. 4D, which illustrates an example quadtree with nested multi-type tree coding block structure.

A maximum supported luma transform size may be 64×64 and the maximum supported chroma transform size may be 32×32, such as in VVC. When the width or height of the CB is larger than the maximum transform width or height, the CB is automatically split in the horizontal and/or vertical direction to meet the transform size restriction in that direction.

The coding tree scheme supports the ability for the luma and chroma to have a separate block tree structure, such as in VTM7. In some cases, for P and B slices, the luma and chroma coding tree blocks (CTBs) in one CTU share the same coding tree structure. However, for I slices, the luma and chroma can have separate block tree structures. When a separate block tree mode is applied, a luma CTB is partitioned into CUs by one coding tree structure, and the chroma CTBs are partitioned into chroma CUs by another coding tree structure. This means that a CU in an I slice may include, or consist of, a coding block of the luma component or coding blocks of two chroma components, and a CU in a P or B slice may always include, or consist of, coding blocks of all three color components unless the video is monochrome.

In order to support the extended coding block partitions, multiple transform sizes (e.g., ranging from 4-point to 64-point for each dimension) and transform shapes (e.g., square or rectangular with width/height ratio's 2:1/1:2 and 4:1/1:4) may be utilized, such as in AV1.

Figure 5A:
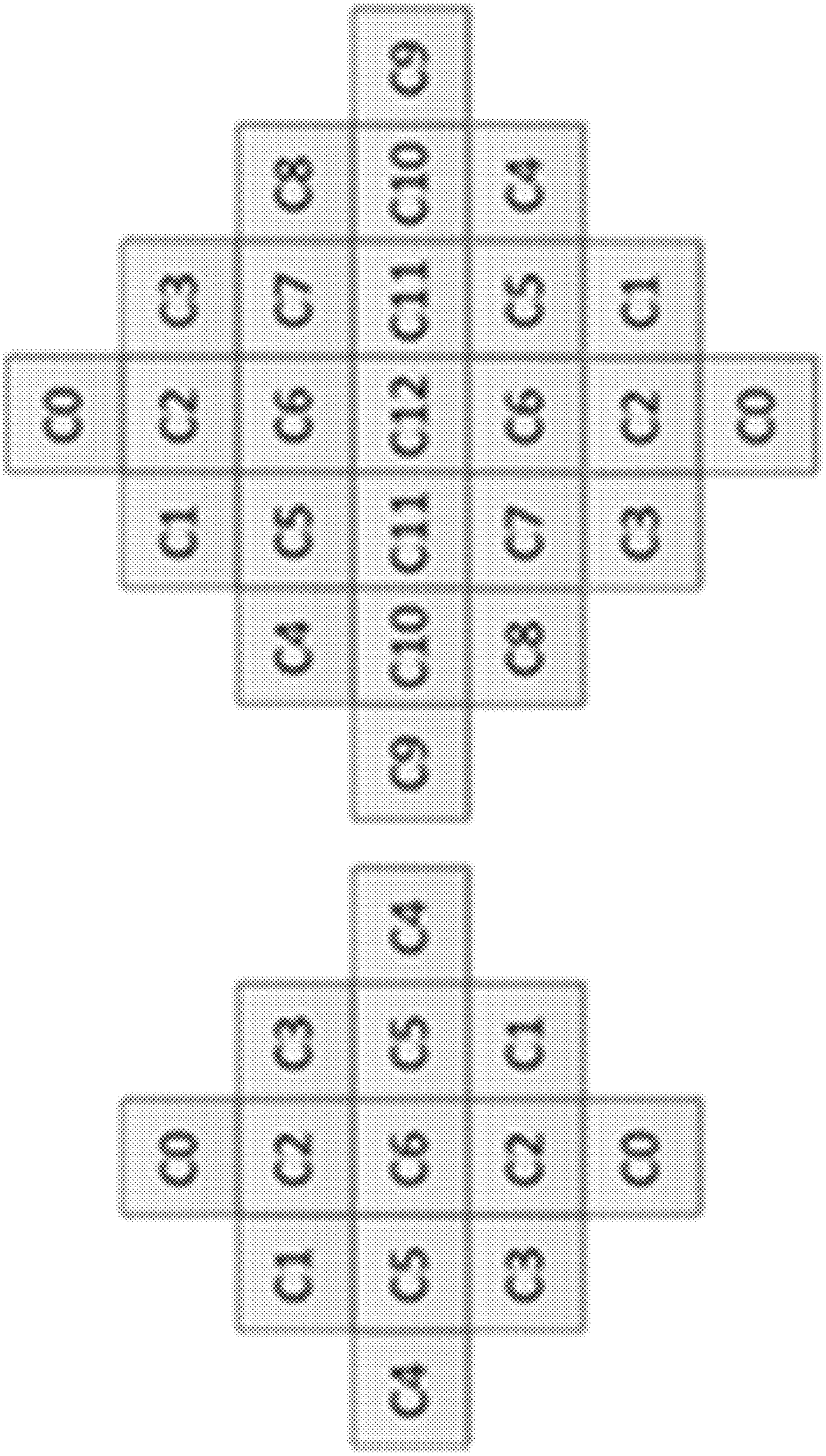
FIG. 5A shows example filter shapes in accordance with some embodiments.

A loop filter can be applied to a block (e.g., a CU) to reduce distortion introduced in the encoding process and therefore improve the reconstructed quality. For example, an adaptive loop filter (ALF) with block-based filter adaption can be applied. As an example, for a luma component, one of twenty-five filters is selected for each 4×4 block, based on the direction and activity of local gradients. FIG. 5A illustrates example ALF filter shapes in accordance with some embodiments. The two diamond filter shapes shown in FIG. 5A can be used with an ALF filter. For example, the 7×7 diamond shape is applied for the luma component and the 5×5 diamond shape is applied for the chroma component.

For a luma component, each 4×4 block can be categorized into one of twenty-five classes. The classification index C can be derived based on its directionality D and a quantized value of activity Â, as follows:

Classification Index $$C = 5D + \hat{A} \quad \text{Equation 1}$$

To calculate D and A, gradients of the horizontal, vertical, and two diagonal directions are first calculated using 1-D Laplacian, as shown in Equations 2-5 below.

Equation 2–Vertical Gradient $$g_v = \sum_{k=i-2}^{i+3} \sum_{l=j-2}^{j+3} V_{k,1},\ V_{k,1} = |2R(k, l) - R(k, l-1) - R(k, l+1)|$$

Equation 3–Horizontal Gradient $$g_h = \sum_{k=i-2}^{i+3} \sum_{l=j-2}^{j+3} H_{k,l},\ H_{k,l} = |2R(k, l) - R(k-1, l) - R(k+1, l)|$$

Equation 4–First Diagonal Gradient $$g_{d1} = \sum_{k=i-2}^{i+3} \sum_{l=j-2}^{j+3} D1_{k,1},$$

$$D1_{k,l} = |2R(k, l) - R(k-1, l-1) - R(k+1, l+1)|$$

Figure 5B:
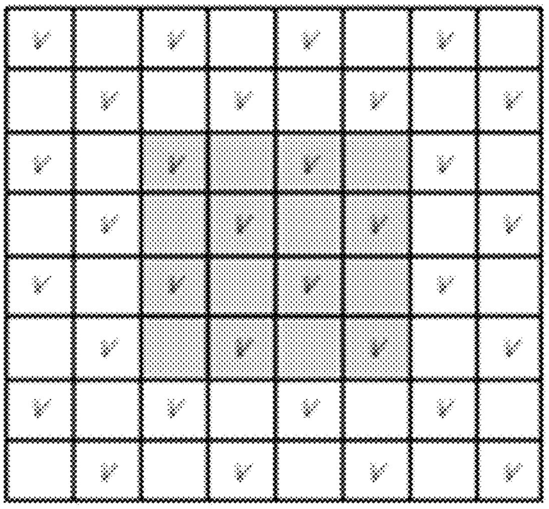
FIG. 5B shows example subsample positions for gradient calculations in accordance with some embodiments.
Figure 5B:
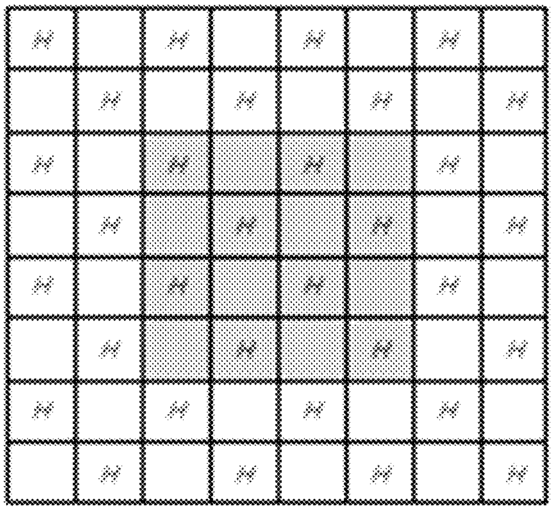
Figure 5B:
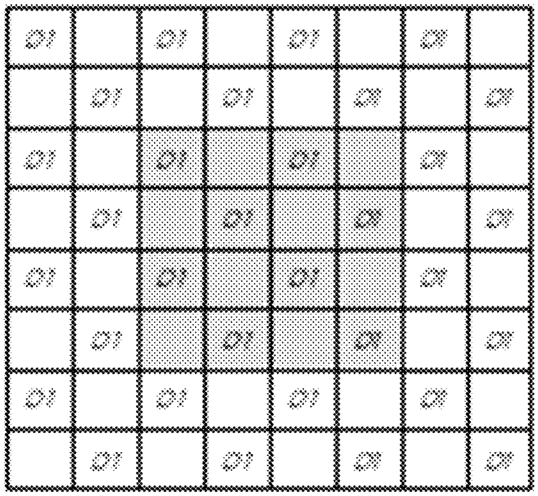
Figure 5B:
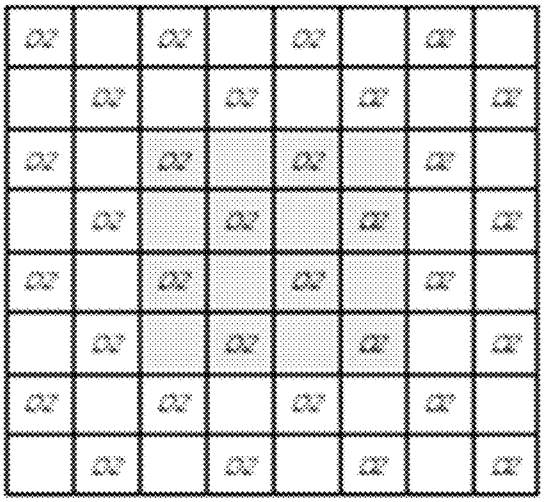

Equation 6–Second Diagonal Gradient $$g_{d2} = \sum_{k=i-2}^{i+3} \sum_{j=j-2}^{j+3} D2_{k,l},$$

$$D2_{k,l} = |2R(k, l) - R(k-1, l+1) - R(k+1, l-1)|$$

Where indices i and j refer to the coordinates of the upper left sample within the 4×4 block and R(i,j) indicates a reconstructed sample at coordinate (i,j). To reduce the complexity of block classification, a subsampled 1-D Laplacian calculation can be applied. As shown in FIG. 5B, the same subsampled positions are used for gradient calculation of all directions.

The D maximum and minimum values of the gradients of horizontal and vertical directions are set as shown in Equation 7 and the maximum and minimum values of the gradient of two diagonal directions are set as shown in Equation 8 below.

Equation 7-Maximum and Minimum Horizontal and Vertical Gradients $$g_{h,v}^{max} = \max(g_h, g_v),\ g_{h,v}^{min} = \min(g_h, g_v)$$

Equation 8 – Maximum and Minimum Diagonal Gradients $$g_{d1,d2}^{max} = \max(g_1, g_2),\ g_{d1,d2}^{min} = \min(g_{d1}, g_{d2})$$

To derive the value of the directionality D, these values are compared against each other and with two thresholds $t_1$ and $t_2$. For example, at step 1, if both $$g_{h,v}^{max} \le t_1 \cdot g_{h,v}^{min}$$

and $$g_{d1,d2}^{max} \le t_1 \cdot g_{d1,d2}^{min}$$

are true, D is set to 0. At step 2, if $$g_{h,v}^{max} / g_{h,v}^{min} > g_{d1,d2}^{max} / g_{d1,d2}^{min},$$

continue to step 3; otherwise continue to step 4. At step 3, if $$g_{h,v}^{max} > t_2 \cdot g_{h,v}^{min},$$

D is set to 2; otherwise D is set to 1. At step 4, $$g_{d1,d2}^{max} > t_2 \cdot g_{d1,d2}^{min},$$

D is set to 4; otherwise D is set to 3.

The activity value A is calculated as:

$$A = \sum_{k=i-2}^{i+3} \sum_{l=j-2}^{j+3} (V_{k,l} + H_{k,l}) \quad \text{Equation 9—Activity Value}$$

A is further quantized to the range of 0 to 4, inclusively, and the quantized value is denoted as Â.

For chroma components in a picture, a classification method need not be applied, e.g., a single set of ALF coefficients is applied for each chroma component.

ALF filter parameters can be signaled in an adaptation parameter set (APS). For example, in one APS, up to 25 sets of luma filter coefficients and clipping value indexes, and up to eight sets of chroma filter coefficients and clipping value indexes can be signalled. To reduce bits overhead, filter coefficients of different classification for luma component can be merged. In slice header, the indices of the APSs used for the current slice are signaled. For example, the signaling of ALF is CTU-based in VVC (Draft 8).

Clipping value indexes, which are decoded from the APS, allow determining clipping values using a table of clipping values for luma and chroma. These clipping values are dependent of the internal bitdepth. The table of clipping values can be obtained by applying Equation 10 below.

Equation 10—Clipping Values $$AlfClip = \{\text{round}(2^{B-\alpha*n}) \text{ for } n \in [0 \ldots N-1]\}$$

with B equal to the internal bitdepth, α being a pre-defined constant value equal to 2.35, and N equal to 4, which is the number of allowed clipping values in VVC (Draft 8). Table 1 below shows an output of Equation 10.

In a slice header, up to 7 APS indices can be signaled to specify the luma filter sets that are used for the current slice. The filtering process can be further controlled at CTB level. For example, a flag is signaled to indicate whether ALF is applied to a luma CTB. A luma CTB can choose a filter set from among 16 fixed filter sets and the filter sets from APSs. A filter set index can be signaled for a luma CTB to indicate which filter set is applied. The 16 fixed filter sets may be pre-defined and hard-coded in both the encoder and the decoder.

For a chroma component, an APS index can be signaled in a slice header to indicate the chroma filter sets being used for the current slice. At CTB level, a filter index can be signaled for each chroma CTB if there is more than one chroma filter set in the APS.

The filter coefficients can be quantized with norm equal to 128. In order to restrict the multiplication complexity, a bitstream conformance can be applied so that the coefficient value of the non-central position shall be in the range of −27 to 27−1, inclusive. The central position coefficient is not signalled in the bitstream and is considered as equal to 128.

TABLE 1

AlfClip based on bitDepth and clipIdx

| | clipIdx | | | |
|---|---|---|---|---|
| bitDepth | 0 | 1 | 2 | 3 |
| 8 | 255 | 50 | 10 | 2 |
| 9 | 511 | 100 | 20 | 4 |
| 10 | 1023 | 201 | 39 | 8 |
| 11 | 2047 | 402 | 79 | 15 |
| 12 | 4095 | 803 | 158 | 31 |
| 13 | 8191 | 1607 | 315 | 62 |
| 14 | 16383 | 3214 | 630 | 124 |
| 15 | 32767 | 6427 | 1261 | 247 |
| 16 | 65535 | 12855 | 2521 | 495 |

At decoder side, when ALF is enabled for a CTB, each sample R(i,j) within the CU is filtered, resulting in sample value R'(i,j) as shown below in Equation 11.

Equation 11—Sample Value Calculation $$R'(i,j) = R(i,j) + \left(\left(\sum_{k\neq 0}\sum_{l\neq 0} f(k,l) \times K(R(i+k, j+l) - R(i,j), c(k,l)) + 64\right) \gg 7\right)$$

where f(k,l) denotes the decoded filter coefficients, K(x,y) is the clipping function and c(k,l) denotes the decoded clipping parameters. The variables k and 1 vary between $$-\frac{L}{2} \text{ and } \frac{L}{2}$$

where L denotes the filter length. The clipping function K(x,y)=min(y,max(—y,x)) which corresponds to the function Clip3 (−y,y,x). By incorporating this clipping function, this loop filtering method becomes a non-linear process, sometimes referred to as non-linear ALF. The selected clipping values can be coded in the alf_data syntax element by using a Golomb encoding scheme corresponding to the index of the clipping value in Table 1. This encoding scheme is the same as the encoding scheme for the filter index.

In order enhance coding efficiency, a coding unit synchronous picture quadtree-based adaptive loop filter can be applied. For example, the luma picture is split into several multi-level quadtree partitions, and each partition boundary is aligned to the boundaries of the largest coding units (LCUs). Each partition has its own filtering process and thus be called as a filter unit (FU).

A 2-pass encoding flow can be applied. At the first pass, the quadtree split pattern and the best filter of each FU are decided. The filtering distortions can be estimated by fast filtering distortion estimation (FFDE) during the decision process. According to the decided quadtree split pattern and the selected filters of all FUs, the reconstructed picture is filtered. At the second pass, the CU synchronous ALF on/off control is performed. According to the ALF on/off results, the first filtered picture is partially recovered by the reconstructed picture.

Figure 5C:
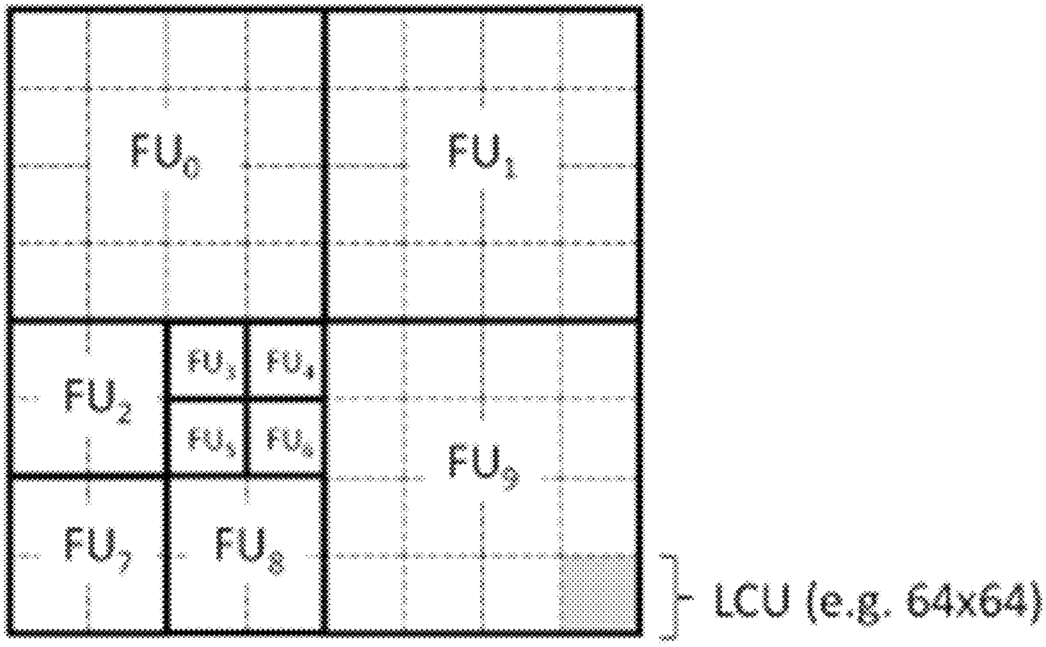
FIG. 5C shows an example quadtree splitting approach in accordance with some embodiments.
Figure 5D:
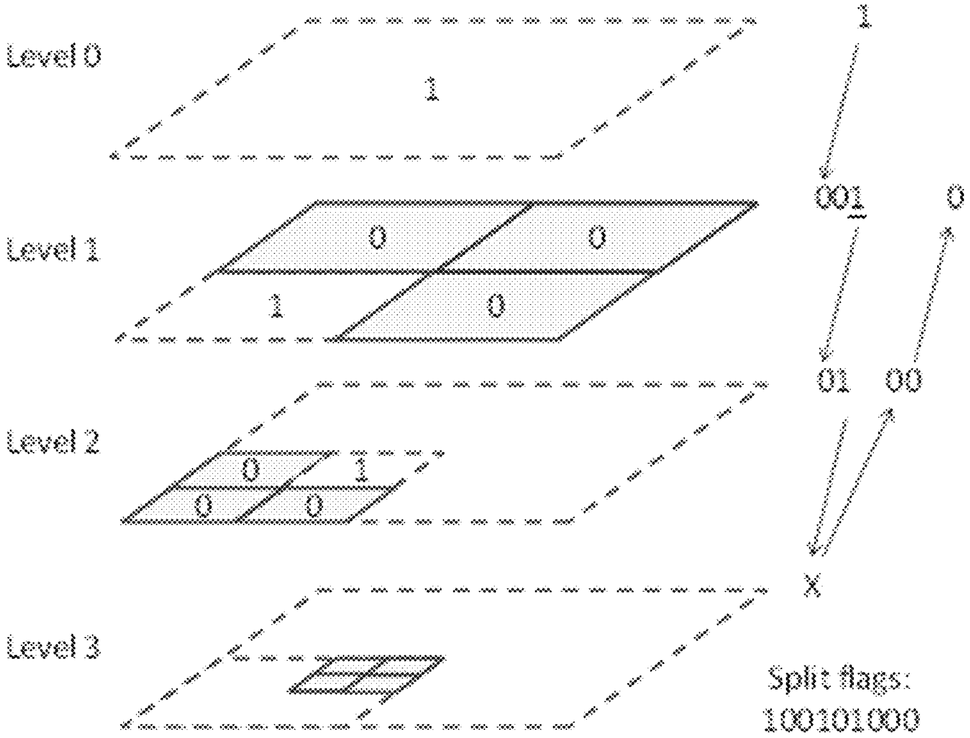
FIG. 5D shows example quadtree split flags encoded in z-order in accordance with some embodiments.

A top-down splitting strategy can be used to divide a picture into multi-level quadtree partitions by using a rate-distortion criterion. Each partition is called a filter unit. The splitting process aligns quadtree partitions with LCU boundaries. The encoding order of FUs follows the z-scan order. For example, in FIG. 5C, the picture is split into 10 FUs, and the encoding order is FU0, FU1, FU2, FU3, FU4, FU5, FU6, FU7, FU8, and FU9. To indicate the picture quadtree split pattern, split flags can be encoded and transmitted in z-order. FIG. 5D shows a quadtree split pattern in correspondence with FIG. 5C.

The filter of each FU can be selected from two filter sets based on the rate-distortion criterion. The first set has ½-symmetric square-shaped and rhombus-shaped filters newly derived for the current FU. The second set comes from time-delayed filter buffers; the time-delayed filter buffers store the filters previously derived for FUs of prior pictures. The filter with the minimum rate-distortion cost of these two sets is chosen for the current FU. Similarly, if the current FU is not the smallest FU and can be further split into 4 children FUs, the rate-distortion costs of the 4 children FUs are calculated. By comparing the rate-distortion cost of the split and non-split cases recursively, the picture quadtree split pattern can be decided. If the maximum quadtree split level is 2, the maximum number of FUs is 16. During the quadtree split decision, the correlation values for deriving Wiener coefficients of the 16 FUs at the bottom quadtree level (smallest FUs) can be reused. The rest of the FUs can derive their Wiener filters from the correlations of the 16 FUs at the bottom quadtree level. Therefore, there is only one frame buffer access for deriving the filter coefficients of all FUs.

After the quadtree split pattern is decided, to further reduce the filtering distortion, a CU synchronous ALF on/off control is performed. By comparing the filtering distortion and non-filtering distortion, the leaf CU can explicitly switch ALF on/off in its local region. The coding efficiency may be further improved by redesigning the filter coefficients according to the ALF on/off results. However, the redesigning process needs additional frame buffer accesses. With some encoder designs there is no redesign process after the CU synchronous ALF on/off decision in order to minimize the number of frame buffer accesses.

A loop filtering approach named cross-component sample offset (CCSO) can reduce distortion of reconstructed samples. In CCSO, given processed input reconstructed samples of a first color component, a non-linear mapping is used to derive output offset, and the output offset is added on the reconstruction sample of another color component in the filtering process of the CCSO.

Figure 5E:
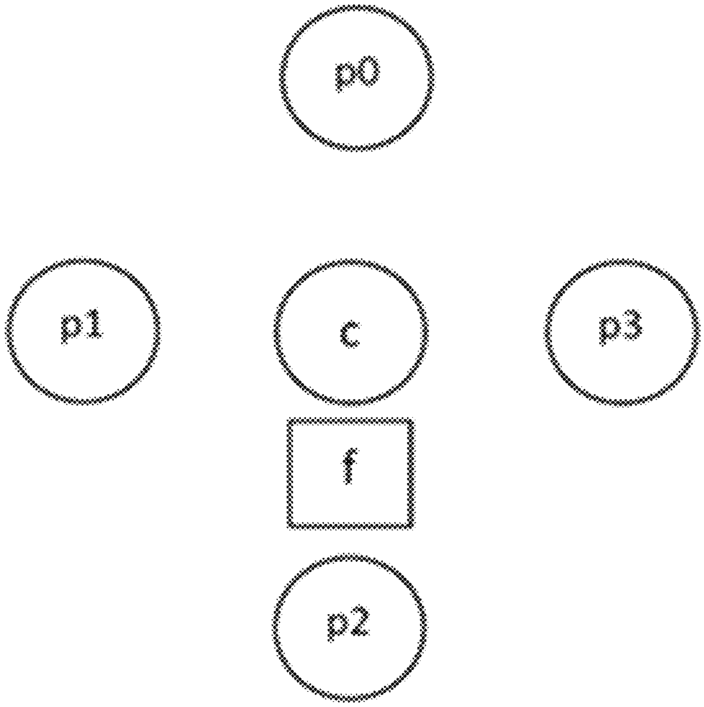
FIG. 5E shows an example filter support area in accordance with some embodiments.

The input reconstructed samples are from a first color component located in filter support area. As shown in FIG. 5E, the filter support area includes four reconstructed samples: p0, p1, p2, p3. The four input reconstructed samples follow a cross-shape in vertical and horizontal direction. The center sample c in the first color component and the sample f to filter in the second color component are co-located. In some embodiments, the center sample c corresponds to a luma pixel and the sample f corresponds to a chroma pixel. When processing the input reconstructed samples, following steps can be applied. At step 1 the delta value between p0–p3 and c are computed, denoted as m0, m1, m2, and m3. At step 2 the delta value m0–m3 are further quantized, the quantized values are denoted as d0, d1, d2, d3. For example, the quantized value can be −1, 0, 1 based on the following criteria: (i) d=−1, if m<−N; (ii) d=0, if −N<=m<=N; or (iii) d=1, if m>N. In this example, N is called the quantization step size and example values of N are 4, 8, 12, 16.

d0-d3 can be used to identify one combination of the non-linear mapping. CCSO has four filter taps d0-d3, and each filter tap may have one of the three quantized values, so there are 3^4=81 combinations in total. Example offset values are integers, such as 0, 1, −1, 3, −3, 5, −5, −7. The final filtering process of CCSO is applied using Equation 12 below.

$$f' = \text{clip}(f + s) \qquad \text{Equation 12–Filtered Sample Value}$$

where f is the reconstructed sample to filter, and s is the output offset value retrieved from a table of combinations identified by d0-d3. The filtered sample value f' is further clipped into the range associated with bit-depth.

As shown above, in CCSO, multiple syntaxes may need to be signaled in a picture header or at block level, such as the quantization step size, filter shape index, band information, and the like. However, this information is costly to signal (especially for small resolutions) and limits the coding performance of CCSO. In accordance with some embodiments, the quantization step size, number of bands, and/or filter shape values are predicted from the quantization step size, number of bands, and/or filter shape index values applied to a different picture, frame, plane, slice or block.

Figure 6A:
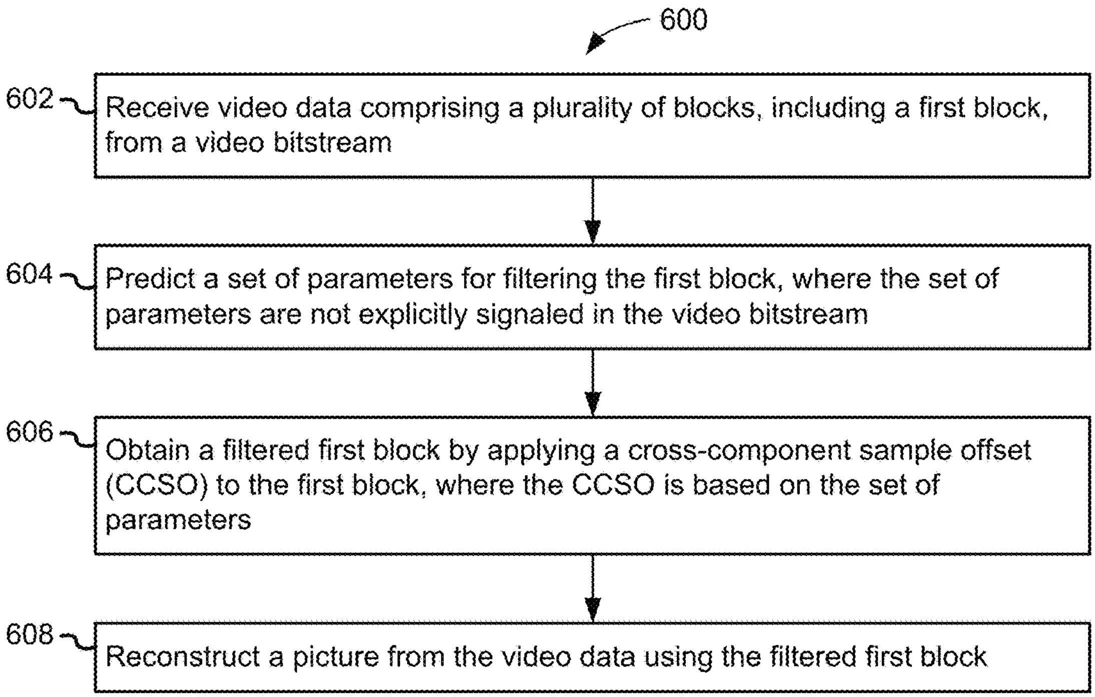
FIG. 6A is a flow diagram illustrating an example method of decoding video in accordance with some embodiments.

FIG. 6A is a flow diagram illustrating a method 600 of decoding video in accordance with some embodiments. The method 600 may be performed at a computing system (e.g., the server system 112, the source device 102, or the electronic device 120) having control circuitry and memory storing instructions for execution by the control circuitry. In some embodiments, the method 600 is performed by executing instructions stored in the memory (e.g., the memory 314) of the computing system.

The system receives (602) video data comprising a plurality of blocks, including a first block, from a video bitstream. The system determines (604) a plurality of transform coefficients associated with the first block. In some embodiments, the system obtains a syntax element value from the video bitstream, where the syntax element value indicates a difference in a parameter associated with the first block and a reference parameter associated with a second block, and where the parameter is one of a set of parameters.

The system predicts (606) a set of parameters for filtering the first block, where the set of parameters are not explicitly signaled in the video bitstream. In some embodiments, the system derives a value of the parameter associated with the first block based on the syntax element value, where the parameter associated with the first block is not explicitly signaled in the video bitstream.

The system obtains (608) a filtered first block by applying a cross-component sample offset (CCSO) to the first block, where the CCSO is based on the set of parameters. The system reconstructs (610) a picture from the video data using the filtered first block. The method 600 is optionally applied to luma and/or chroma blocks. As used herein, the term 'block' may be interpreted as a prediction block, a coding block, or a coding unit (CU). The term 'block' may also be used to refer to a transform block, a coding tree unit (cru) block, or a CCSO superblock. For example, a CCSO filtering process uses reconstructed samples of a first color component as input (e.g., Y, Cb, or Cr), and the output is applied on a second color component that is a different color component from the first color component.

In some embodiments, the set of parameters include a number of bands, a quantization step size, and/or a filter shape. In some embodiments, the quantization step size, number of bands, and/or filter shape values are predicted from the quantization step size, number of bands, and filter shape index values applied to a different picture, frame, plane, slice or block. In some embodiments, instead of signaling the quantization step size, number of bands, and/or filter shape index values, the delta between these indices and the predicted/previous indices are signaled.

In some embodiments, the difference between the current and previous picture, frame, plane, slice or block's quantization step, number of bands, and/or filter shape values is signaled. In some embodiments, the difference between one or multiples of the current and previous picture, frame, plane, slice or block's quantization step, number of bands, and/or filter shape values is signaled. In some embodiments, sign and magnitude of the delta value are signaled separately. In some embodiments, a look-up table based signaling method is used. For example, an index of the look-up table representing the delta value is signaled.

In some embodiments, whether the quantization step size, number of bands, and/or filter shape index values are predicted is signaled by a flag in high level syntax (HLS), including, but not limited to an APS, a slice header, a frame header, a picture parameter set (PPS), a sequence parameter set (SPS), or a video parameter set (VPS). In some embodiments, one flag is signaled for one or multiples of the quantization step size, number of bands, and/or filter shape index values to indicate whether the values are predicted or explicitly signaled. In some embodiments, at least one of the quantization step size, number of bands, and filter shape index values is not signaled but derived from the predicted index values.

In some embodiments, the signaling of the quantization step size, number of bands, and/or filter shape index values is altogether skipped, and the predicted/previous values are used instead. The prediction of the quantization step size, number of bands, and/or filter shape index values using the previous picture, frame, plane, slice or block values may depend on coded information including but not limited to the frame type, temporal layer, and/or quantization parameter.

Figure 6B:
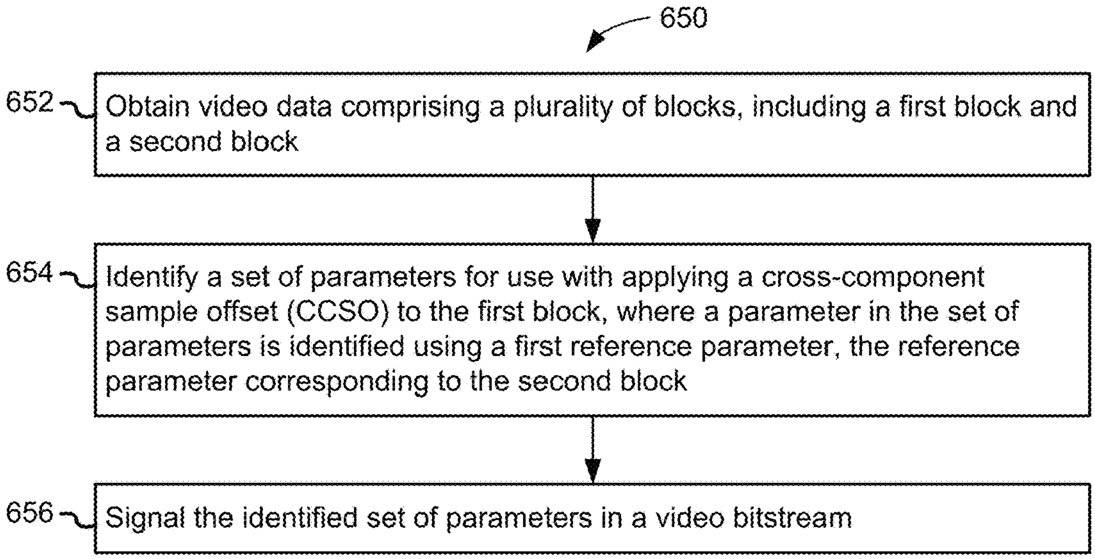
FIG. 6B is a flow diagram illustrating an example method of encoding video in accordance with some embodiments.

FIG. 6B is a flow diagram illustrating a method 650 of decoding video in accordance with some embodiments. The method 650 may be performed at a computing system (e.g., the server system 112, the source device 102, or the electronic device 120) having control circuitry and memory storing instructions for execution by the control circuitry. In some embodiments, the method 650 is performed by executing instructions stored in the memory (e.g., the memory 314) of the computing system.

The system obtains (652) video data comprising a plurality of blocks, including a first block and a second block. The system identifies (654) a set of parameters for use with applying a cross-component sample offset (CCSO) to the first block, where a parameter in the set of parameters is identified using a first reference parameter, the reference parameter corresponding to the second block. The system signals (656) signaling the identified set of parameters in a video bitstream. The method 650 is optionally applied to luma and/or chroma blocks.

For example, the encoder search for optimal quantization step, band, and/or filter shape values for a current picture, frame, plane, slice or block is optimized using the previously selected/predicted quantization step, band, and/or filter shape values for reduced encoder complexity.

In some embodiments, the encoder search for at least one of the quantization step size, number of bands, and/or filter shape index values is altogether skipped, and the predicted/previous values are used instead. In some embodiments, the predicted/previously selected values are used for reducing the encoder search of the optimal quantization step size, number of bands, and filter shape index values.

The use of the previously selected/predicted quantization step size, number of bands and filter shape index values for optimizing the encoder search for selection of the current values may depend on coded information including but not limited to the frame type, temporal layer, and/or quantization parameter.

Although FIGS. 6A and 6B illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that various stages could be implemented in hardware, firmware, software, or any combination thereof.

Turning now to some example embodiments.

(A1) In one aspect, some embodiments include a method (e.g., the method 600) of video decoding. In some embodiments, the method is performed at a computing system (e.g., the server system 112) having memory and control circuitry. In some embodiments, the method is performed at a coding module (e.g., the coding module 320). In some embodiments, the method is performed at a parser (e.g., the parser 254). The method includes: (i) obtaining video data comprising a plurality of blocks, including a first block, from a video bitstream; (ii) predicting a set of parameters for filtering the first block, where the set of parameters are not explicitly signaled in the video bitstream; (iii) obtaining a filtered first block by applying a cross-component sample offset (CCSO) to the first block, where the CCSO is based on the set of parameters; and (iv) reconstructing a picture from the video data using the filtered first block. For example, the CCSO filtering process uses reconstructed samples of a first color component as input (e.g., Y, Cb, or Cr), and the output is applied on a second color component that is a different color component from the first color component. In some embodiments, the first block is a luma block or a chroma block. In some embodiments, the set of parameters correspond to a different type of filtering and/or decoding operation (e.g., a non-CCSO filtering process or other transform operation).

In some embodiments, the method includes: (i) obtaining video data comprising a plurality of blocks, including a first block, from a video bitstream; (ii) predicting a set of parameters for filtering or transforming the first block, where the set of parameters are not explicitly signaled in the video bitstream; (iii) obtaining a filtered or transformed first block by applying a filter or transformation to the first block, where the filter or transformation is based on the set of parameters; and (iv) reconstructing a picture from the video data using the filtered or transformed first block.

In some embodiments, the method includes: (i) receiving video data comprising a plurality of blocks, including a first block, from a video bitstream; (ii) obtaining a syntax element value from the video bitstream, wherein the syntax element value indicates a difference in a parameter associated with the first block and a reference parameter associated with a second block, where the parameter is one of a set of parameters; (iii) deriving a value of the parameter associated with the first block based on the syntax element value, where the parameter associated with the first block is not explicitly signaled in the video bitstream; (iv) obtaining a filtered first block by applying a cross-component sample offset (CCSO) to the first block, wherein the CCSO is based on the set of parameters; and (v) reconstructing a picture from the video data using the filtered first block.

(A2) In some embodiments of A1, the set of parameters include a number of bands, a quantization step size, and/or a filter shape. For example, the band value may be 0-127 or 128-255.

(A3) In some embodiments of A1 or A2, respective values for the set of parameters are derived based on a set of reference parameters, the set of reference parameters associated with the second block and including the reference parameter. In some embodiments, the set of parameters corresponds to a first picture, frame, plane, and/or slice and the set of reference parameters correspond to a different picture, frame, plane, and/or slice. In some embodiments, a filtered second block is obtained by applying the cross-component sample offset (CCSO) to the second block, where the CCSO applied to the second block uses the set of reference parameters.

(A4) In some embodiments of A3, the method further includes obtaining, from the video bitstream, an indication of a difference between the set of parameters and the set of reference parameters, where the respective values for the set of parameters are derived based on the indication of the difference. For example, a difference between the current and previous picture, frame, plane, slice or block's parameters (e.g., quantization step, number of bands, and/or filter shape values) is signaled.

(A5) In some embodiments of A4, obtaining, from the video bitstream, the indication of the difference comprises obtaining a sign of the difference and obtaining a magnitude of the difference. For example, sign and magnitude of the delta value are signaled separately. Signaling the differences separately can improve entropy encoding efficiency.

(A6) In some embodiments of any of A1-A5, the method further includes obtaining, from the video bitstream, indication of respective differences between the set of parameters and one or more sets of reference parameters. For example, instead of signaling the quantization step size, number of bands, and/or filter shape index values, a delta between these indices and the predicted/previous indices are signaled. For example, differences between one or more of the current and previous picture, frame, plane, slice, or block's parameters (e.g., quantization step, number of bands and filter shape values) are signaled.

(A7) In some embodiments of A6, the indication of the respective differences comprises an index to a look-up table. For example, a look-up table based signaling method is used. In some embodiments, an index of the look-up table representing a delta value is signaled.

(A8) In some embodiments of any of A1-A7, the method further includes: (i) obtaining, from the video bitstream, an indication of whether the second set of parameters should be predicted; (ii) in accordance with the indication indicating that the second set of parameters are not to be predicted, forgoing predicting the second set of parameters for filtering the first block; and (iii) in accordance with the indication indicating that at least a subset of the second set of parameters are to be predicted, predicting the at least a subset of the second set of parameters. For example, whether the quantization step size, number of bands, and/or filter shape index values are predicted can be signaled by a flag in high level syntax (HLS), including, but not limited to an adaptation parameter set (APS), a slice header, a frame header, a picture parameter set (PPS), a sequence parameter set (SPS), or a video parameter set (VPS). In some embodiments, the method includes: (i) obtaining, from the video bitstream, an indication of whether a second set of parameters should be derived; (ii) in accordance with the indication indicating that the second set of parameters are not to be derived, forgoing deriving the second set of parameters for filtering the first block; and (iii) in accordance with the indication indicating that at least a subset of the second set of parameters are to be derived, deriving the at least a subset of the second set of parameters.

(A9) In some embodiments of A8, the indication corresponds to one or more parameters of the set of parameters. For example, one flag may be signaled for one or multiples of the quantization step size, number of bands, and/or filter shape index values to indicate whether the values are predicted or explicitly signaled.

(A10) In some embodiments of A8 or A9, the method further includes, in accordance with the indication indicating that the second set of parameters are not to be predicted (derived), obtaining the second set of parameters from the video bitstream. For example, parameters that are not to be predicted are explicitly signaled in the video bitstream.

(A11) In some embodiments of any of A1-A10, at least one parameter of the set of parameters is derived from a predicted index value. For example, at least one of the quantization step size, number of bands, and filter shape index values is not signaled but derived from the predicted index values. In some embodiments, others of the set of parameters is explicitly signaled. For example, one parameter of the set of parameters is predicted and another parameter of the set of parameters is explicitly signaled.

(A12) In some embodiments of any of A1-A11, at least one parameter of the set of parameters is predicted (derived) based on a value of the at least one parameter is a previous block. For example, signaling of the quantization step size, number of bands. and/or filter shape index values is skipped. In this example, predicted and/or previous values are used instead. For example, values are predicted for the at least one parameter based on context information (e.g., one or more aspects of the first block and/or previous values used for at least one parameter (e.g., in a previous picture, frame, plane, slice, or block). As another example, previous values for at least one parameter are used for the at least one parameter (e.g., used directly).

(A13) In some embodiments of any of A1-A12, the set of parameters are predicted (derived) based on previously coded information. For example, the quantization step size, number of bands, and/or filter shape index values are predicted using the previous picture, frame, plane, slice or block values. In some embodiments, at least one parameter of the set of parameters is predicted based on coded information such as the frame type, temporal layer, and/or quantization parameter.

(B1) In another aspect, some embodiments include a method of video encoding (e.g., the method 650). In some embodiments, the method is performed at a computing system (e.g., the server system 112) having memory and control circuitry. In some embodiments, the method is performed at a coding module (e.g., the coding module 320). In some embodiments, the method is performed at an entropy coder (e.g., the entropy coder 214). The method includes: (i) obtaining video data comprising a plurality of blocks, including a first block and a second block; (ii) identifying a set of parameters for use with applying a cross-component sample offset (CCSO) to the first block, where a parameter in the set of parameters is identified using a first reference parameter, the reference parameter corresponding to the second block; and (iii) signaling the identified set of parameters in a video bitstream. For example, encoder search for optimal quantization step, band, and filter shape values for a current picture, frame, plane, slice or block is optimized using the previously selected/predicted quantization step, band, and/or filter shape values resulting in reduced encoder/encoding complexity. In some embodiments, the set of parameters for use with applying the CCSO to the first block are identified, but the identified set of parameters are not signaled in a video bitstream. In some embodiments, the method includes: (i) obtaining video data comprising a plurality of blocks, including a first block and a second block; (ii) identifying a set of parameters for use with applying a transformation or filter to the first block, where a parameter in the set of parameters is identified using a first reference parameter, the reference parameter corresponding to the second block; and (iii) signaling the identified set of parameters in a video bitstream.

(B2) In some embodiments of B 1, the first reference parameter is a predicted parameter for the second block.

(B3) In some embodiments of B1 or B2, the first reference parameter is a selected parameter for the second block. For example, the first reference parameter was used to apply a CCSO filter to the second block.

(B4) In some embodiments of any of B1-B3, the set of parameters include a number of bands, a quantization step size, and/or a filter shape.

(B5) In some embodiments of any of B1-B4, identifying the parameter using the first reference parameter comprising forgoing performing an optimization search for the parameter. For example, the encoder search for at least one of the quantization step size, number of bands, and filter shape index values is altogether skipped, and the predicted/previous values are used instead.

(B6) In some embodiments of any of B1-B5, the method further includes identifying the first reference parameter based on previously coded information. For example, the use of the previously selected/predicted quantization step size, number of bands, and filter shape index values for optimizing the encoder search for selection of the current values depends on coded information, such as the frame type, temporal layer, and/or quantization parameter.

(B7) In some embodiments of any of B1-B6, the parameter in the set of parameters is identified using a set of reference parameters, the set of reference parameters including the first reference parameter.

(B8) In some embodiments of B7, identifying the parameter includes performing an optimization search using the set of reference parameters and selecting a reference parameter from the set of reference parameters that has a lowest associated cost.

The methods described herein may be used separately or combined in any order. Each of the methods may be implemented by processing circuitry (e.g., one or more processors or one or more integrated circuits). In some embodiments, the processing circuitry executes a program that is stored in a non-transitory computer-readable medium. Although the embodiments above are described with reference to CCSO filtering. The methods described herein apply to other filtering approaches, such as the ones described previously with reference to FIGS. 5A-5D.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A13 and B1-B8 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A13 and B1-B8 above).

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of video decoding performed at a computing system having memory and one or more processors, the method comprising:

receiving video data comprising a plurality of blocks, including a first block, from a video bitstream;

obtaining a syntax element value from the video bitstream, wherein the syntax element value indicates a delta between a cross-component sample offset (CCSO) parameter indicating a number of bands for the first block and a reference CCSO parameter indicating a second number of bands for a second block, wherein the CCSO parameter is one of a set of CCSO parameters for the first block, and wherein the reference CCSO parameter is used to apply a first CCSO to the second block;

deriving, using the delta, a value of the CCSO parameter indicating the number of bands for the first block, wherein the CCSO parameter is not explicitly signaled in the video bitstream;

obtaining a filtered first block by applying a second CCSO to the first block, wherein the second CCSO uses the set of parameters, including the CCSO parameter indicating the number of bands for the first block; and reconstructing a picture from the video data using the filtered first block.

2. The method of claim 1, wherein the set of parameters includes one or more of the number of bands, a quantization step size, and a filter shape for the first block.

3. The method of claim 1, wherein respective values for the set of parameters are derived based on respective deltas for a set of reference parameters, the set of reference parameters associated with the second block and including the reference parameter.

4. The method of claim 1, wherein the syntax element indicates a sign of the delta and a magnitude of the delta.

5. The method of claim 1, further comprising obtaining, from the video bitstream, indication of respective delta values between the set of parameters and one or more sets of reference parameters.

6. The method of claim 5, wherein the indication of respective delta values comprises an index to a look-up table.

7. The method of claim 1, further comprising:

obtaining, from the video bitstream, an indication of whether a second set of parameters should be derived;

in accordance with the indication indicating that the second set of parameters are not to be derived, forgoing deriving the second set of parameters for filtering the first block; and in accordance with the indication indicating that at least a subset of the second set of parameters are to be derived, deriving the at least a subset of the second set of parameters.

8. The method of claim 7, wherein the indication corresponds to one or more parameters of the set of parameters.

9. The method of claim 7, further comprising, in accordance with the indication indicating that the second set of parameters is not to be derived, obtaining the second set of parameters from the video bitstream.

10. The method of claim 1, wherein at least one parameter of the set of parameters is derived from a predicted index value.

11. The method of claim 1, wherein at least one parameter of the set of parameters is derived based on a value of the at least one parameter for a previous block.

12. The method of claim 1, wherein the set of parameters is derived based on previously coded information.

13. A method of video encoding performed at a computing system having memory and one or more processors, the method comprising:

receiving video data comprising a plurality of blocks, including a first block;

determining a set of parameters, including a first parameter indicating a number of bands, for applying a cross-component sample offset (CCSO) to the first block;

determining a delta between the first parameter and a reference CCSO parameter indicating a number of bands for a second block of the plurality of blocks, wherein a second CCSO is applied to the second block using the reference CCSO parameter; and signaling a syntax element value in a video bitstream, the syntax element value indicating the delta between the first parameter and the reference CCSO parameter.

14. The method of claim 13, wherein the set of parameters includes one or more of the number of bands, a quantization step size, and a filter shape.

15. The method of claim 13, wherein respective values for the set of parameters are derived based on a set of reference parameters, the set of reference parameters associated with the second block and including the reference parameter.

16. The method of claim 15, further comprising signaling, in the video bitstream, an indication of a delta value between the set of parameters and the set of reference parameters.

17. The method of claim 16, wherein the syntax element indicates a sign of the delta value and a magnitude of the delta value.

18. The method of claim 13, further comprising signaling, in the video bitstream, an indication of respective delta values between the set of parameters and one or more sets of reference parameters.

19. A non-transitory computer-readable storage medium storing one or more instructions and a video bitstream that is generated by a video encoding method, the one or more instructions when executed by a processor, cause a computing system to perform the video encoding method, the video encoding method comprising:

determining a set of parameters, including a cross-component sample offset (CCSO) parameter indicating a number of bands for a current block of video data;

determining a delta between the CCSO parameter and a reference CCSO parameter, wherein a second CCSO is applied to a second block of the video data using the reference CCSO parameter; and signaling, in the video bitstream, a syntax element that indicates the delta between the CCSO parameter indicating the number of bands for the current block and the reference CCSO parameter indicating the number of bands for the second block.

20. The non-transitory computer-readable storage medium of claim 19, wherein respective values for the set of parameters are derived based on respective deltas for a set of reference parameters, the set of reference parameters associated with the second block and including the reference parameter.

* * * * *